(12) United States Patent  
Hult

(10) Patent No.: US 6,337,611 B1  
(45) Date of Patent: Jan. 8, 2002

(54) SLEEVE IN A RADIO FREQUENCY FILTER

(75) Inventor: Leif Hult, Järfälla (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/467,020

(22) Filed: Dec. 20, 1999

(30) Foreign Application Priority Data

Dec. 21, 1998 (SE) ................................................ 9804453

(51) Int. Cl.⁷ .............................. H01P 1/20; H01P 7/04; H01P 7/06; H01P 7/00
(52) U.S. Cl. ..................... 333/202; 333/203; 333/207; 333/235; 333/224; 333/232
(58) Field of Search ................................ 333/203, 207, 333/235, 223–226, 231–233, 202

(56) References Cited

U.S. PATENT DOCUMENTS

| 2,516,056 A | | 7/1950 | Keizer |
| 2,594,037 A | | 4/1952 | Landon et al. |
| 3,972,013 A | * | 7/1976 | Shapiro ................. 333/97 R |
| 4,035,749 A | * | 7/1977 | Slocum et al. ........... 333/83 R |
| 4,360,301 A | | 11/1982 | Mosberger |
| 4,760,843 A | | 8/1988 | Fischer et al. |
| 5,791,846 A | | 8/1998 | Mayr |
| 5,847,627 A | * | 12/1998 | Radzikowski et al. ....... 333/202 |
| 6,198,366 B1 | * | 3/2001 | Dahl et al. ................. 333/235 |
| 6,222,428 B1 | * | 4/2001 | Akesson et al. ........... 333/235 |

FOREIGN PATENT DOCUMENTS

| FR | 1549508 | 12/1968 |
| GB | 2192249 A | 6/1988 |
| SE | 220032 | 4/1968 |

* cited by examiner

Primary Examiner—Robert Pascal  
Assistant Examiner—Patricia T. Nguyen  
(74) Attorney, Agent, or Firm—Nixon & Vanderhye P.C.

(57) ABSTRACT

In a sleeve in a radio frequency filter at least one portion having a lateral dimension being smaller than the diameter of a screw to be threaded through the sleeve is provided. The portion is flexible in a radial direction, so that a screw threaded through the sleeve will be secured by a clamping force. The increased friction provided by this clamping force will hold the screw in a locked position. The magnitude of the clamping force can be varied within broad ranges, and the optimum force will be different for different applications. Thus, by using such a screw and sleeve, there is no need for a lock nut and the screw does not need to be readjusted once placed in the correct position.

13 Claims, 4 Drawing Sheets

SLEEVE IN A RADIO FREQUENCY FILTER

TECHNICAL FIELD

The present invention relates to a sleeve, and in a particular to an arrangement for securing a screw, such as a tuning screw, in the sleeve.

DESCRIPTION OF RELATED ART

In many applications it is of interest to secure a screw. One such application is tunable low-pass and band-pass filters for use in the radio frequency range.

Such filters are designed to allow electromagnetic frequencies within a predetermined range pass through the filter and to block frequencies outside that range. Furthermore, in Microwave Filters, Impedance-Matching Networks, and Coupling Structures, by G. Mattaei, L. Young, and E. M. T. Jones (Artech House Books—Dedham, Mass., Copyright, 1980), the design of such filters is described in detail.

Further, low-pass and band-pass filters for use in the radio frequency range typically comprises a filter housing having a number of resonator members located inside it. The filter is tuned to have desired characteristics by means of tuning screws located above the resonators, which screws projects through the wall and/or cover plate of the filter housing so that they can be adjusted from outside the filter housing. A more detailed description of how a such a filter operates can be found in the book by G. Mattaei et. al cited above.

Also, in the U.S. Pat. Nos. 5,023,579 and 4,775,847, and in the European patent application EP 0 817 301 A1, conventional radio frequency filters are disclosed.

In FIG. 1, a general view of a band-pass filter 20 according to the state of the art is shown. Generally such a filter comprises a filter housing 18, an input terminal 22 at a first end of the housing and an output terminal 24 at a second end of the housing. Inside the housing resonators 26 are located. Above the resonators tuning screws 28 are located. The tuning screws are secured by lock nuts 30.

The lock nuts 30 are provided so that the tuning screws, once they have been adjusted to the correct position, can be locked in this position. This is very important in a filter of the type described above, since only a small deviation from the correct position of one of the tuning screws may result in a malfunction of the filter.

However, the use of lock nuts is associated with a problem. Thus, once the tuning screws have been screwed to the correct position and the filter is tuned correctly, the screws should be secured in a locked position by means of the lock nuts. When the lock nuts are brought in place, it is almost impossible to not change the position of the tuning screws. The tuning screws must then be re-adjusted. This procedure must in some cases be repeated more than one time, which of course is time consuming and therefore undesired.

SUMMARY

It is an object of the present invention to overcome the drawbacks of the securing arrangements according to the prior art and to provide a screw which is easy to secure and which does not need to be readjusted once adjusted to the correct position.

This object and others are obtained by a screw threaded through a sleeve in a radio frequency filter, the sleeve having at least one portion having a lateral dimension being smaller than the diameter of the screw and which portion is flexible in a radial direction.

Thus, when the screw is threaded through the sleeve, the portion of the sleeve having the smaller dimension will impose a clamping force on the screw. The increased friction provided by this clamping force will hold the screw in a locked position. The magnitude of the clamping force can be varied within broad ranges, and the optimum force will be different for different applications.

BRIEF DESCRIPTION OF THE DRAWINGS

The present invention will now be described in more detail by way of non-limiting examples and with reference to the accompanying drawings, in which.

DESCRIPTION OF PREFERRED EMBODIMENTS

Figure 2:
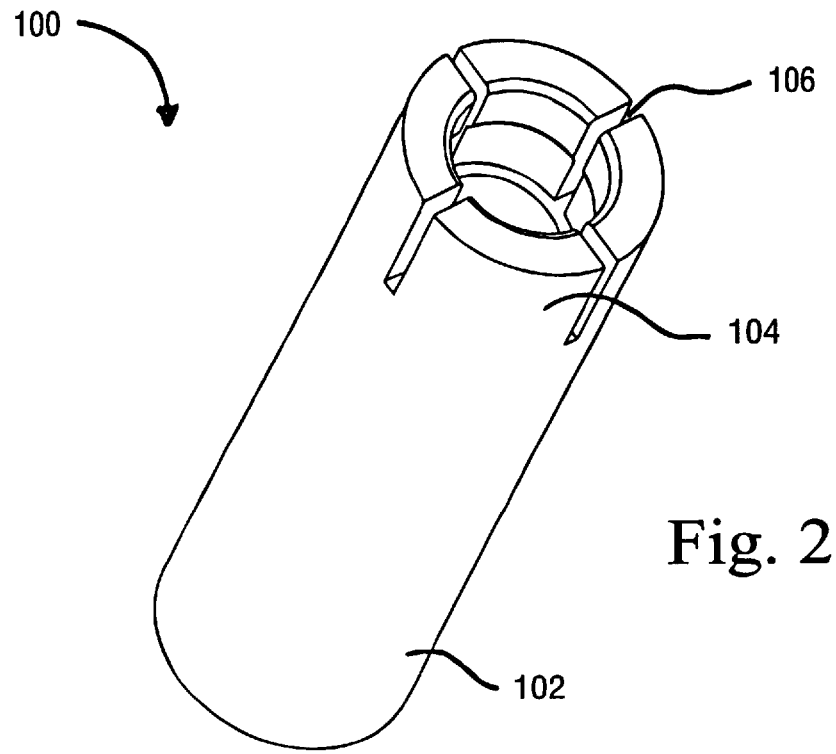
FIG. 2 is a view in perspective of a sleeve.

In FIG. 2, a perspective view of a sleeve 100 is shown. The sleeve can for example be arranged to act as a centre conductor in a radio frequency filter. The sleeve 100 comprises a first threaded portion 102 having a lateral dimension designed to receive a screw having a particular diameter and a second portion 104 having a lateral dimension being smaller than the first portion 102. Furthermore, elongated openings 106 are provided in the second portion 104.

Thus, when a screw is screwed through the sleeve 100 the second portion 104 will expand in a radial direction, since the second portion has a smaller lateral dimension than the screw, and has openings 106, which allow the portion to expand. The second portion will apply a clamping force on the screw threaded through the sleeve, which will hold the screw in a locked position. The sleeve can for example be made of brass or aluminium, and is preferably made out of a single work piece. Other materials are also possible, but in the case when the sleeve is to act as a centre conductor, the material should be an electrically conducting material.

Figure 3:
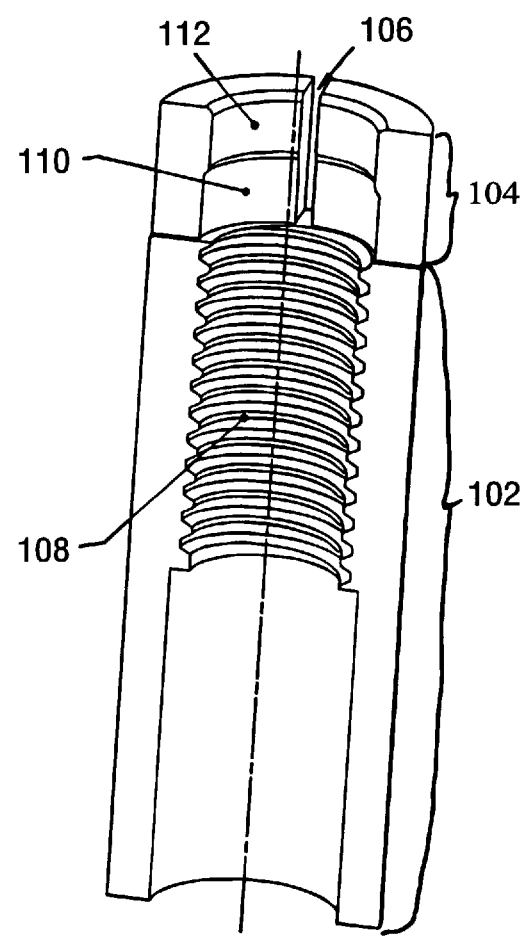
FIG. 3 is a sectional view in perspective of the sleeve in FIG. 2.

In FIG. 3, a sectional view in perspective of the sleeve 100 is shown. FIG. 3 shows the threads 108 on the inside of the first portion. In a preferred embodiment the second portion 104 has an unthreaded part 110 having a circumferential indentation forming a clearance between the screw and the sleeve. The part 110 is therefore not in contact with a screw threaded through the sleeve. Thus, only a top portion 112 will be clamping a screw threaded through the sleeve 100.

Figure 4:
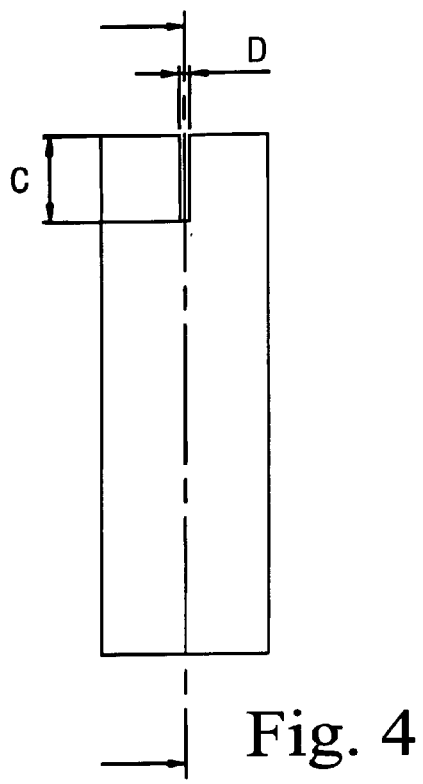
FIG. 4 is a view from the side of a sleeve.

In FIG. 4, a view from the side of the sleeve is shown. By varying the sizes C and D, the clamping force can be adjusted to a suitable value for a particular application.

Figure 5:
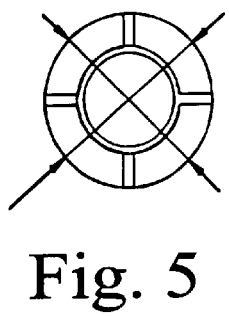
FIG. 5 is a view from above of a sleeve.

In FIG. 5, a view from above of the sleeve is shown. As seen in the figure the clamping forces will act on a screw threaded through the sleeve in a radial direction directed to the centre of the screw, as indicated by the arrows.

Figure 6:
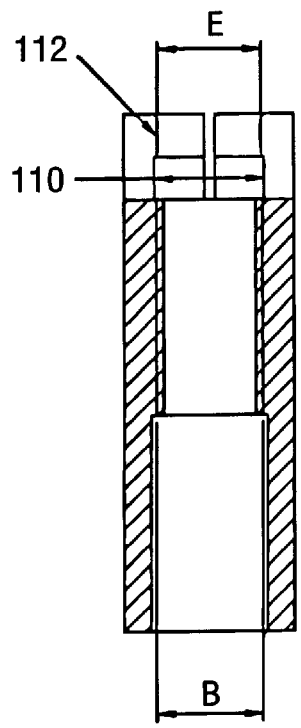
FIG. 6 is a sectional view from the side of a sleeve.

In FIG. 6, a sectional view from the side of the sleeve is shown. The size B is the lateral dimension of the threading arranged to receive a screw. The size E is the lateral dimension of the portion 104, which has a dimension being smaller than the dimension B. In FIG. 6, the surface 112 of the portion 104 is flat. By varying the size E different clamping forces are obtained.

Figure 7:
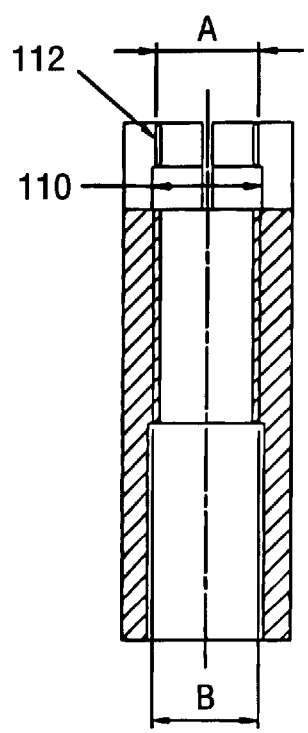
FIG. 7 is a sectional view similar to the view in FIG. 6 illustrating a sleeve according to a another embodiment.

In FIG. 7, a sectional view from the side of the sleeve according to another embodiment is shown. The size B is the lateral dimension of the threading arranged to receive a screw. The size A is the lateral dimension of the portion 104, which has a dimension being smaller than the dimension B. In FIG. 7, the surface 112 of the portion 104 is threaded. The use of threads in the portion 104 is advantageous in some applications, since the screw will be locked in an axial direction as well.

Figure 8:
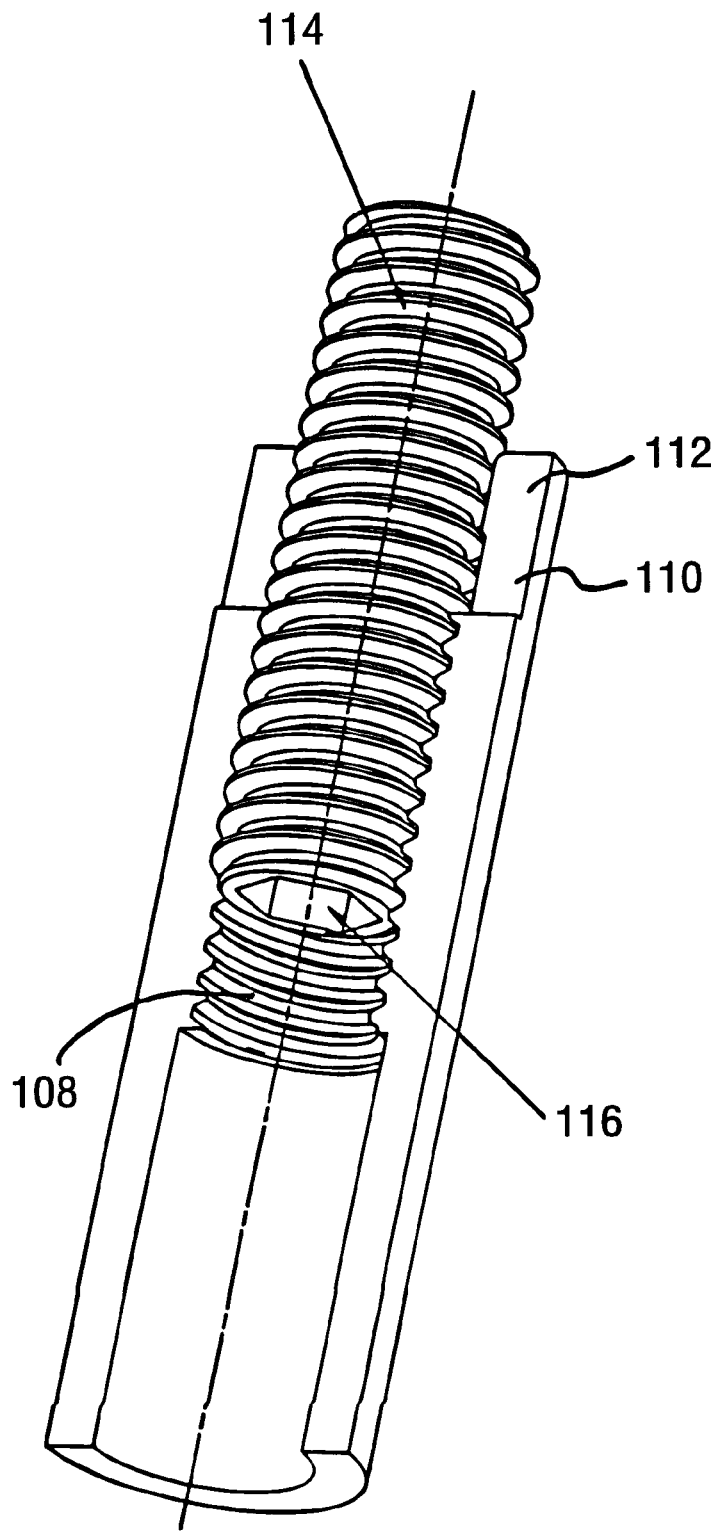
FIG. 8 is a sectional view of a sleeve with a screw threaded therein.

In FIG. 8, a sectional view of sleeve with a screw 114 threaded therein is shown. Since the screw is threaded in a sleeve which secures the screw without a lock nut, the screw can be a socket head cap screw having a socket head cap 116. This is advantageous since it then becomes harder to come into contact with the screw by mistake, once it has been screwed into its correct position, and which otherwise might change the correct position of the tuning screw.

Figure 1:
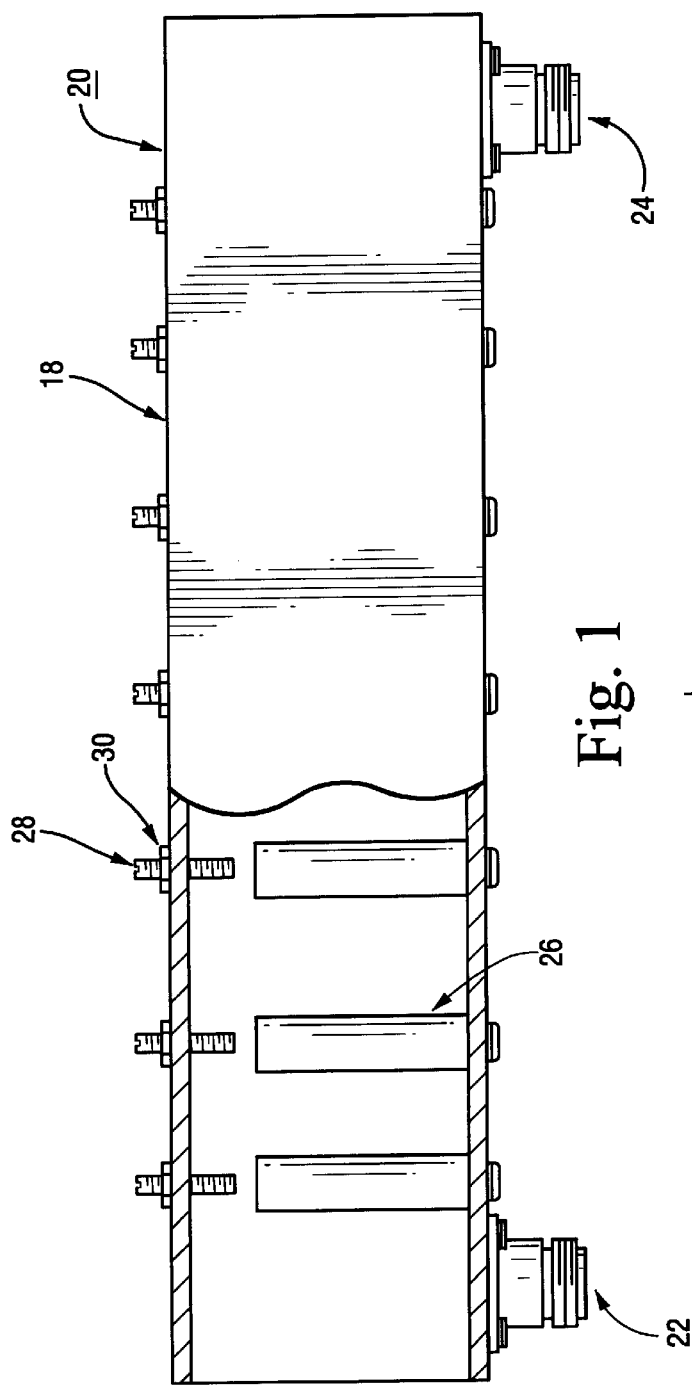
FIG. 1 is a general view of a radio frequency filter according to the prior art.
Figure 9:
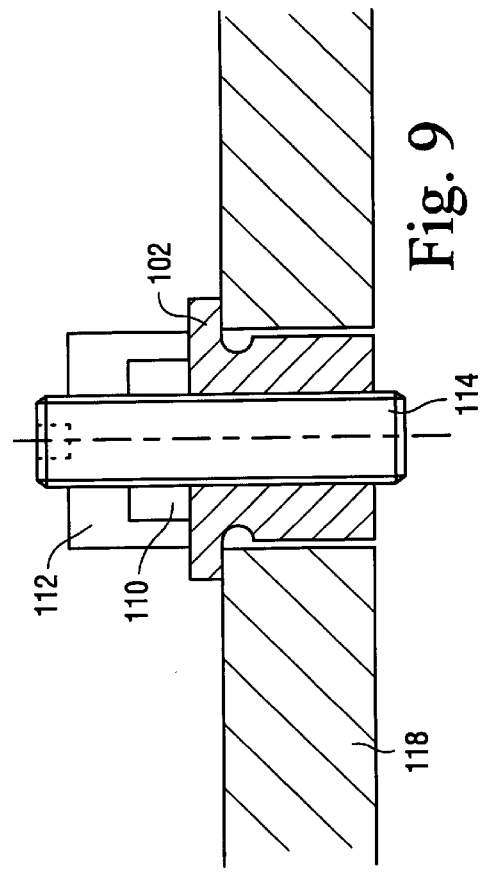
FIG. 9 is a sectional view from the side of a wall of a radio frequency filter.

In FIG. 9, the sleeve 100 as described above is shown located in the wall 118 of a radio frequency filter. Thus, the tuning screw 114 is threaded in a sleeve as described above, which is located in the wall of a filter housing. In another preferred embodiment the sleeve 100 can be arranged in the cover plate of a radio frequency filter.

The invention as described above is not limited to sleeves having a circular perimeter, but can also have a polygonal inside and/or outside perimeter. Furthermore, in order to make the portion having a smaller diameter than the screw expandable in a radial direction, other solutions than providing elongated openings/apertures in the top of the sleeve are possible. For example the openings can be made wide or located in the middle of the sleeve. The second portion can also be made of a material being flexible in it self, such as a plastics material.

The sleeve as described herein can also be used for securing aperture screws arranged in radio frequency filters, and can also be integral the wall and/or cover plate of the filter. The sleeve may also be manufactured as a separate part, if this should turn out to be advantageous in a particular application.

By using the screw and sleeve as described herein no lock nuts are required in order for the screw to be locked in the correct position in the radio frequency filter. Furthermore, the clamping force holding the screw in place can be adjusted for a particular application by varying simple design parameters in the sleeve, such as the lateral dimension of the portion having a smaller dimension than the diameter of the screw threaded through the sleeve.

What is claimed is:

1. A sleeve in a radio frequency filter for receiving a screw, the sleeve comprising a first portion having threads corresponding to the diameter of the screw, and a second portion having a lateral dimension being smaller than the diameter of the screw and arranged to expand in a radial direction when the screw is threaded through the sleeve, wherein an inner surface of the second portion is threaded.

2. A sleeve according to claim 1, characterized in that openings are provided in the second portion.

3. A sleeve according to claim 1, characterized in that the second portion has an unthreaded part having a circumferential indentation.

4. A sleeve according to claim 1, characterized in that the inner surface of the second portion is flat.

5. A sleeve according to claim 1, characterized in that the sleeve is made of a metal or another conducting material.

6. A sleeve according to claim 1 characterized in that the sleeve is made of aluminum or brass.

7. A radio frequency filter comprising a filter housing and at least one tuning screw arranged to be threaded through the wall and/or cover plate of the filter housing, a sleeve for receiving the screw provided in the wall or cover plate, the sleeve comprising a first portion having threads corresponding to the diameter of the screw and a second portion having a lateral dimension being smaller than the diameter of the screw, the second portion being arranged to expand in a radial direction when the screw is threaded through the sleeve so that the screw will be secured by a clamping force when threaded through the sleeve, wherein an inner surface of the second portion of the sleeve is threaded.

8. A filter according to claim 7, characterized in that openings are provided in the second portion of the sleeve.

9. A filter according to claim 7, characterized in that the second portion of the sleeve has an unthreaded part having a circumferential indentation.

10. A filter according to claim 7, characterized in that the inner surface of the second portion of the sleeve is flat.

11. A filter according to claim 7, characterized in that the sleeve is integral with the wall or cover plate of the housing.

12. A filter according to claim 7, characterized in that the sleeve is arranged to act as a center conductor in the filter.

13. A filter according to claim 7, further comprising at least one aperture screw, characterized in that the aperture screw is threaded in a sleeve according to claim 1.

* * * * *